United States Patent
Jain

(10) Patent No.: US 9,094,838 B2
(45) Date of Patent: *Jul. 28, 2015

(54) ROBUST WIRELESS COMMUNICATION SYSTEM FOR NODES LOCATED IN VEHICLES

(75) Inventor: Vivek Jain, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 431 days.

This patent is subject to a terminal disclaimer.

(21) Appl. No.: 13/551,821

(22) Filed: Jul. 18, 2012

(65) Prior Publication Data

US 2013/0157703 A1    Jun. 20, 2013

Related U.S. Application Data

(63) Continuation of application No. 13/249,176, filed on Sep. 29, 2011, now abandoned.

(51) Int. Cl.
| | |
|---|---|
| *H04B 7/00* | (2006.01) |
| *H04W 24/00* | (2009.01) |
| *H04W 84/18* | (2009.01) |
| *H04L 1/00* | (2006.01) |
| *G01D 21/00* | (2006.01) |
| *H04L 1/08* | (2006.01) |
| *H04L 1/04* | (2006.01) |
| *H04W 28/06* | (2009.01) |
| *H04W 72/00* | (2009.01) |
| *H04W 72/12* | (2009.01) |
| *H04W 84/00* | (2009.01) |
| *H04W 88/06* | (2009.01) |
| *H04W 72/08* | (2009.01) |

(Continued)

(52) U.S. Cl.
CPC ............... *H04W 24/00* (2013.01); *G01D 21/00* (2013.01); *H04B 7/00* (2013.01); *H04L 1/00* (2013.01); *H04L 1/04* (2013.01); *H04L 1/08* (2013.01); *H04W 84/18* (2013.01); *H04L 1/0071* (2013.01); *H04L 1/20* (2013.01); *H04W 28/065* (2013.01); *H04W 72/00* (2013.01); *H04W 72/082* (2013.01); *H04W 72/12* (2013.01); *H04W 84/005* (2013.01); *H04W 88/04* (2013.01); *H04W 88/06* (2013.01)

(58) Field of Classification Search
USPC .................... 455/500, 41.2, 505, 569.2, 575.9
See application file for complete search history.

(56) References Cited

U.S. PATENT DOCUMENTS

| | | | |
|---|---|---|---|
| 7,450,538 B2 * | 11/2008 | Apneseth et al. | ............. 370/322 |
| 8,570,150 B1 * | 10/2013 | Bowen et al. | ................. 340/8.1 |
| 2007/0101367 A1 * | 5/2007 | Lee et al. | ........................ 725/39 |

(Continued)

*Primary Examiner* — Dominic E Rego

(74) *Attorney, Agent, or Firm* — Maginot Moore & Beck LLP

(57) ABSTRACT

A communication method for a wireless communication network in a vehicle is disclosed where the network includes a plurality of sensor nodes and a receiving node. The method includes wirelessly transmitting first sensor data from a first sensor node and second sensor data from a second sensor node using first and second frequency channels, and receiving the first and second sensor data at the receiving node. The method can include rearranging the order of transmitting sensor data, and aggregating sensor data at the sensor nodes. The method can include testing the quality of the wireless links; and using the links with the best quality whether indirect or direct links. The receiving node can simultaneously receive data from more than one node using different frequencies. The nodes can transmit data in parallel using different frequencies. The network can include helper nodes. The wireless communication network can be designed as a tree.

18 Claims, 10 Drawing Sheets

(51) Int. Cl.
   *H04W 88/04*         (2009.01)
   *H04L 1/20*          (2006.01)

(56) References Cited

U.S. PATENT DOCUMENTS

| | | | |
|---|---|---|---|
| 2008/0183417 A1* | 7/2008 | Lee et al. | 702/127 |
| 2009/0310545 A1* | 12/2009 | Tateson et al. | 370/329 |
| 2010/0014502 A1* | 1/2010 | Singh et al. | 370/343 |
| 2010/0150267 A1* | 6/2010 | Zangi | 375/296 |
| 2011/0038274 A1* | 2/2011 | Ikemoto et al. | 370/252 |
| 2011/0286381 A1* | 11/2011 | Ye et al. | 370/315 |
| 2012/0014413 A1* | 1/2012 | Keshavarzian et al. | 375/135 |
| 2012/0213062 A1* | 8/2012 | Liang et al. | 370/228 |
| 2014/0146774 A1* | 5/2014 | Baker et al. | 370/329 |

* cited by examiner

|  | $f_1$ | $f_2$ | $f_3$ | $f_4$ | $f_5$ | $f_6$ | $f_7$ | $f_8$ |
|---|---|---|---|---|---|---|---|---|
| Cycle 1,5,9,... | 1 | 12 | 123 | 1234 | 1234 | 1234 | 1234 | 1234 .... |
| Cycle 2,6,10,... | 4 | 43 | 432 | 4321 | 4321 | 4321 | 4321 | 4321 .... |
| Cycle 3,7,11,... | 3 | 34 | 341 | 3412 | 3412 | 3412 | 3412 | 3412 .... |
| Cycle 4,8,12,... | 2 | 21 | 214 | 2143 | 2143 | 2143 | 2143 | 2143 .... |

ROBUST WIRELESS COMMUNICATION SYSTEM FOR NODES LOCATED IN VEHICLES

CROSS REFERENCE TO RELATED APPLICATIONS

This application is a continuation of U.S. patent application Ser. No. 13/249,176, filed on Sep. 29, 2011, entitled "Methods for Robust Wireless Communications for Nodes Located in Vehicles," which is incorporated herein by reference.

BACKGROUND OF THE INVENTION

This patent relates to wireless communication techniques, and more particularly to wireless communication techniques for communication nodes located in vehicles.

There are numerous sensor nodes and receiving units (communication nodes) in modern vehicles that must communicate with one another. These nodes can be located in harsh environments where they are exposed to extreme temperatures, or to weather, debris or other deleterious factors, for example nodes located on wheels to send wheel speed information; on axles to send load balancing information; on bumpers to send nearby object detection information, etc. The information may need to be continuously updated requiring robust communication between the sensor nodes and the receiving units.

Communication between these nodes can be wired or wireless. Wired communication requires running and protecting the wires which may be in harsh or crowded environments, and wired communication may not be suitable for sensors that are subject to movement or rotation. Wireless communication may be preferred but also can be challenging, for example the wireless communication link between the sensor nodes and the receiving node may be poor when there are metal objects surrounding one of the nodes or between the sensor nodes and the receiving node.

It would be desirable to implement wireless communication techniques in a vehicle that facilitate robust wireless communication between the sensor nodes and the receiving unit, satisfying the latency and reliability requirements of the application.

SUMMARY OF THE INVENTION

A communication method for a wireless network in a vehicle is disclosed where the wireless network includes a plurality of wireless sensor nodes and a wireless receiving node. The plurality of wireless sensor nodes includes a first wireless sensor node and a second wireless sensor node. The wireless communication method includes wirelessly transmitting first sensor data on a first set of frequency channels from the first wireless sensor node; transmitting each subsequent packet of first sensor data from the first wireless sensor node on a subsequent frequency of the first set of frequency channels starting over from the first frequency of the first set of frequency channels after using the last frequency of the first set of frequency channels; wirelessly transmitting second sensor data on a second set of frequency channels from the second wireless sensor node; transmitting each subsequent packet of second sensor data from the second wireless sensor node on a subsequent frequency of the second set of frequency channels starting over from the first frequency of the second set of frequency channels after using the last frequency of the second set of frequency channels; and receiving the first sensor data and the second sensor data at the wireless receiving node.

The wireless communication method can also include transmitting sensor data from each of the plurality of wireless sensor nodes in a particular order; and periodically rearranging the order of transmitting sensor data from each of the plurality of wireless sensor nodes.

The wireless communication method can also include receiving the second sensor data at the first wireless sensor node; aggregating the current first sensor data with the latest received second sensor data at the first wireless sensor node; transmitting the aggregated first sensor data and second sensor data from the first wireless sensor node; receiving the first sensor data at the second wireless sensor node; aggregating the current second sensor data with the latest received first sensor data at the second wireless sensor node; and transmitting the aggregated second sensor data and first sensor data from the second wireless sensor node.

The wireless communication method can also include for each of the plurality of wireless sensor nodes: sensing whether the current frequency channel for transmission is currently being used by another wireless sensor node of the plurality of wireless sensor nodes; if the current frequency channel is not being used, then using the current frequency channel for wirelessly transmitting; if the current frequency channel is being used, then switching to the subsequent frequency channel and sensing whether the subsequent frequency channel is currently being used until an unused frequency channel is found, then using the unused frequency channel for wirelessly transmitting.

The wireless communication method can also include testing the quality of all of the wireless communication links in the wireless network; and for each of the plurality of wireless sensor nodes, only using the wireless communication link between that wireless sensor node and the receiving node with the best quality.

The wireless communication method can also include for each wireless node of the plurality of wireless sensor nodes: sensing the interference level of the wireless communication links between that wireless node and each of the other wireless nodes for each of the frequency channels for that wireless node; sensing the interference level of the wireless communication link between that wireless node and the receiving node for each of the frequency channels for that wireless node; and using the frequency channels for that wireless node with the lowest interference levels. This method can also include periodically re-sensing the interference levels of the wireless communication links; and using the frequency channels for that wireless node with the lowest re-sensed interference levels.

The wireless communication method can also include for each wireless node: testing the quality of the direct wireless communication path between that wireless node and the receiving node; testing the quality of indirect wireless communication paths between that wireless node and the receiving node using one or more other wireless nodes as intermediate nodes; determining the wireless communication paths with the highest quality between that wireless node and the receiving node. When an indirect wireless communication path between a source wireless node and the receiving node through an intermediate node provides the highest quality communication path between the source wireless node and the receiving node, the method can also include: receiving sensor data from the source wireless node at the intermediate node; aggregating the sensor data from the source wireless node with the sensor data from the intermediate node at the intermediate node; transmitting the aggregated sensor data of the source wireless node and the intermediate node from the intermediate node; and receiving the aggregated sensor data of the source wireless node and the intermediate node at the receiving node. The wireless network can also include a wireless helper node. The method can also include testing the quality of indirect wireless communication paths between that wireless node and the receiving node using the helper node; and testing the quality of indirect wireless communication paths between that wireless node and the receiving node using the helper node and one or more wireless sensor nodes. When an indirect wireless communication path between a source wireless node and the receiving node through the helper node provides the highest quality communication path between the source wireless node and the receiving node, the method can also include receiving sensor data from the source wireless node at the helper node; transmitting the sensor data of the source wireless node from the helper node; and receiving the sensor data of the source wireless node at the receiving node.

The wireless communication method can also include simultaneously receiving sensor data from more than one of the plurality of wireless nodes at the receiving node. The wireless communication method can also include, while one of the plurality of sensor nodes is transmitting data to the receiving node, simultaneously transmitting sensor data between other of the plurality of wireless nodes.

The wireless communication method can also include designing a tree having the receiving node as a root node and having a plurality of branches coupling the receiving node to each of the plurality of sensor nodes; and transmitting sensor data from each of the plurality of sensor nodes to the receiving node along the branches of the tree. Designing a tree can include determining the quality of the direct wireless communication path between each of the plurality of wireless nodes and the receiving node; determining the quality of indirect wireless communication paths between each of the plurality of wireless nodes and the receiving node using one or more other wireless nodes as intermediate nodes; and designing the tree based on the determined quality of the wireless communication paths between each of the plurality of wireless nodes and the receiving node. The wireless network can also include a wireless helper node. The method can also include determining the quality of indirect wireless communication paths between each of the plurality of wireless nodes and the receiving node using the helper node; and determining the quality of indirect wireless communication paths between each of the plurality of wireless nodes and the receiving node using the helper node and one or more wireless sensor nodes.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 7 illustrates an aggregated data retransmission technique with interleaving and frequency hopping in which the order of sensor node transmissions is changed in different cycles;

Figure 1:
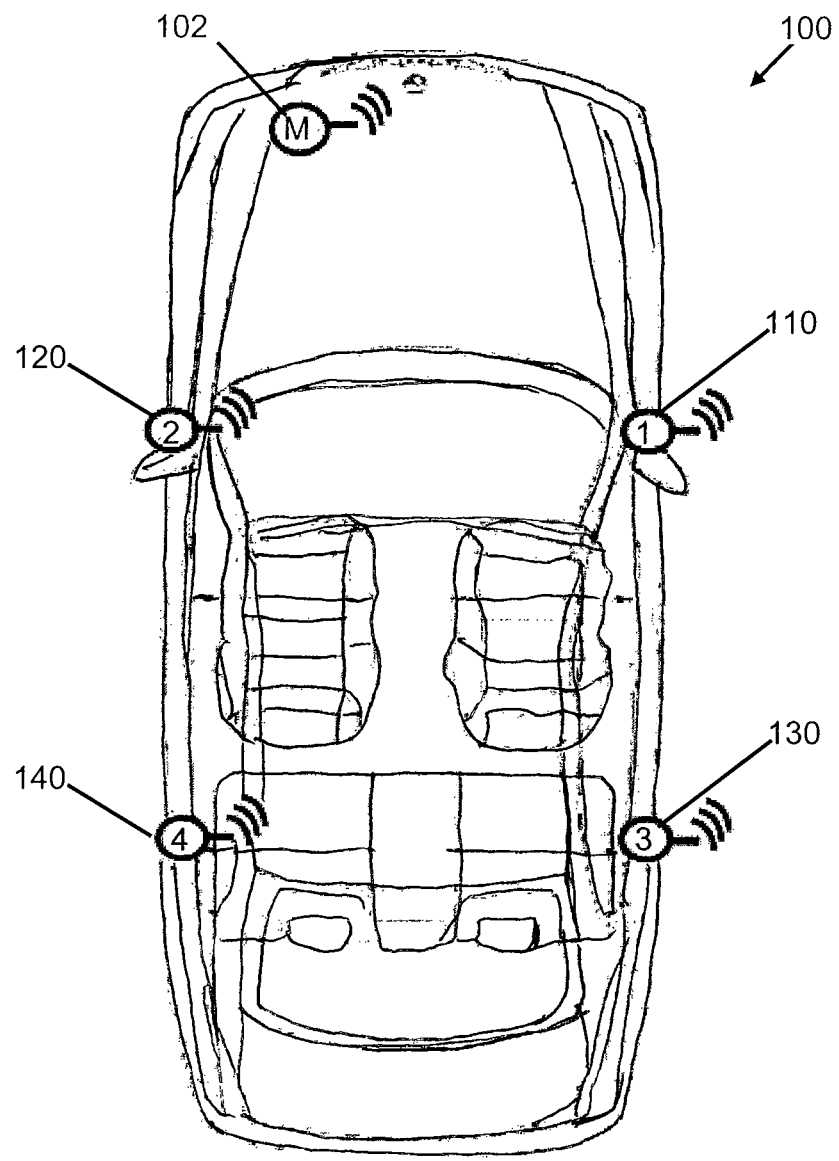
FIG. 1 illustrates an exemplary vehicle sensor network topology that includes multiple sensor nodes that transmit information to a receiving node.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF EXEMPLARY EMBODIMENTS

The present invention describes robust communication methods for wireless nodes located in a vehicle, including for nodes located in harsh environments. Some examples of wireless nodes in harsh conditions include nodes located on wheels to send wheel speed information; on axles to send load balancing information; on bumpers to send nearby object detection information, etc. The information might be continuously updated requiring robust channels between the sensor nodes and the receiving units. Several techniques are proposed to facilitate robust wireless communication between the sensor nodes and the receiving units in a vehicle.

FIG. 1 illustrates an exemplary physical topology for a wireless network 100 in a vehicle, where the wireless network 100 includes a receiving device 102 and a plurality of sensor nodes 110, 120, 130, 140 that transmit information to the receiving device 102. The sensor nodes 110, 120, 130, 140 can include wheel speed sensors, radar sensors, ultrasonic sensors, etc. The receiving device 102 can be part of an electronic stability program (ESP) unit, a human machine interface (HMI) unit, or any of various other receiving systems in the vehicle. The receiving device 102 and the sensors 110, 120, 130, 140 can be located throughout the vehicle depending on the application requirements. For the sake of simplicity and understanding the principles of the communication techniques, a wheel speed sensor application and the physical topology illustrated in FIG. 1 will be used. It will be obvious to those of skill in the art that the same techniques can be applied to various other wireless systems in a vehicle.

In the exemplary wireless network 100 of FIG. 1, there are four wheel speed sensors 110, 120, 130, 140 located at the wheels of the vehicle and a receiving device 102, which can be a master device, located in the ESP unit. The wheel speed information from the sensors 110, 120, 130, 140 is used by the ESP unit 102. Hence the information is safety critical and the reliability and latency requirements for this application are very strict. Nodes located near the wheels are subjected to extreme temperatures and bad weather conditions. In addition, the master node located in the ESP unit 102 is surrounded by numerous metal vehicle parts that can interfere with or block communication with the sensor nodes 110, 120, 130, 140. Thus the link between the wheel nodes 110, 120, 130, 140 and the ESP unit 102 may not always be optimal.

Two possible strategies for reliable transmission of data are proactive retransmissions and reactive/on-demand retransmission. In proactive retransmission, the source node transmits multiple copies of the same data packet assuming one of the copies will get through to the receiving node. In reactive/on-demand retransmission, the source node transmits a data packet and waits for an acknowledgement from the receiving node. Since all packets are acknowledged by the receiving node, the source node knows whether or not the transmission was successful. If no acknowledgement is received (due to either the packet or the acknowledgement being lost) after a certain time period, the source node retransmits the data packet. Where sensor nodes are generally transmitting, the information flow can be continuous and primarily unidirectional. In such cases, the optimal communication strategy may involve sending multiple copies of the same data. The communication mechanism is simple to implement and also reliability increases with each retransmission.

Figure 2:
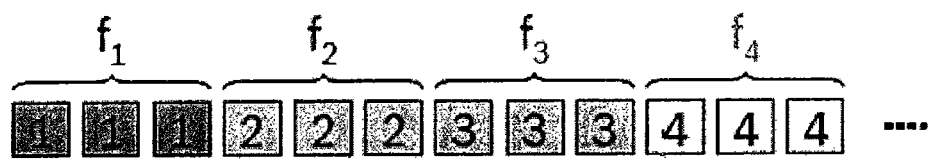
FIG. 2 illustrates a brute force communication technique where each of the sensor nodes sends multiple copies of its data back-to-back to the receiving node.

FIG. 2 illustrates a brute force communication technique where each of the sensor nodes 110, 120, 130, 140 sends multiple copies of its data back-to-back to the receiving node 102. In FIG. 2, a block with the number 1 indicates a data packet from sensor node 110, a block with the number 2 indicates a data packet from sensor node 120, a block with the number 3 indicates a data packet from sensor node 130, and a block with the number 4 indicates a data packet from sensor node 140. The nodes 110, 120, 130, 140 can send on a common frequency. Alternatively, each node can send on its own individual frequency so the nodes can transmit independently of one another, and frequency can also serve to identify the node, or to denote the node type and/or location. FIG. 2 illustrates sensor node 110 sending a data packet three times on frequency f1, sensor node 120 sending a data packet three times on frequency f2, sensor node 130 sending a data packet three times on frequency f3, and sensor node 140 sending a data packet three times on frequency f4.

The brute force technique illustrated in FIG. 2 may be improved by using frequency switching, best link selection, frequency channel ranking or change of transmission route. In frequency switching, when a frequency channel is being used, the transmitter can switch to a different frequency channel to communicate with the receiver. In best link selection, after installation and during initialization, the communication protocol measures and/or assesses the quality of each of the wireless links in the network and then only uses the links with high quality for communication. In frequency channel ranking, during initialization all of the nodes listen to all of the frequency channels to determine the interference level in each frequency channel, the frequency channels are then ranked based on the interference level and the better frequency channels are used more frequently. Since the interference levels can change during operation, the frequency channel rankings can be updated periodically during network operation through a link monitoring process. In change of transmission route, when the receiver can not receive a message, the message can be sent through an alternative transmission route/path in the communication network.

The above enhancements of frequency switching, best link selection and frequency channel ranking are incorporated in the techniques of brute force retransmission with frequency hopping and interleaved retransmission with frequency hopping, and the change of transmission route enhancement is incorporated in the technique of aggregated retransmission, all of which are described below. In these techniques, the order of transmission of the sensor nodes can be changed to ensure fairness, to get better results, to prioritize data from certain nodes, or to prioritize certain types of data.

Figure 3:
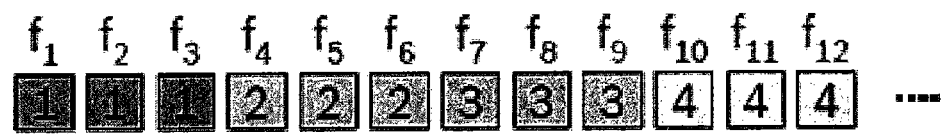
FIG. 3 illustrates a brute force retransmission technique with frequency hopping in which each sensor node continuously progresses through a sequence of different frequency channels, transmitting and/or retransmitting each successive data packet on a new frequency channel.

FIG. 3 illustrates the brute force retransmission technique with frequency hopping. In this technique, each of the sensor nodes 110, 120, 130, 140 continuously progresses through a sequence of different frequency channels, transmitting and/or retransmitting each successive data packet on a new frequency channel. FIG. 3 illustrates sensor node 110 sending a first data packet on frequency f1, then on frequency f2, then on frequency f3; sensor node 120 sending a second data packet on frequency f4, then on frequency f5, then on frequency f6; sensor node 130 sending a third data packet on frequency f7, then on frequency f8, then on frequency f9; and sensor node 140 sending a fourth data packet on frequency f10, then on frequency f11, then on frequency f12. The transmission of the same data on different frequency channels adds more reliability to the system. For example, if frequency f11 is bad then the receiving unit 102 can still receive data from the sensor node 110 on frequency f2 or f3.

Figure 4:
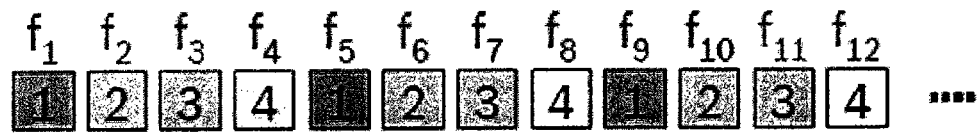
FIG. 4 illustrates an interleaved retransmission technique with frequency hopping in which each sensor node transmits a single copy of its data packet and when all of the nodes have transmitted their data packet, the nodes repeat the same transmission process.

FIG. 4 illustrates the interleaved retransmission technique with frequency hopping. In this technique, each of the sensor nodes 110, 120, 130, 140 transmits a single copy of its data packet and when all of the nodes have transmitted their data packet, the nodes repeat the same transmission process again. FIG. 4 illustrates sensor node 110 sending a first data packet on frequency f1, then sensor node 120 sending a second data packet on frequency f2, then sensor node 130 sending a third data packet on frequency f3, then sensor node 140 sending a fourth data packet on frequency f4, then sensor node 110 sending the first data packet on frequency f5, then sensor node 120 sending the second data packet on frequency f6, then sensor node 130 sending the third data packet on frequency f7, then sensor node 140 sending the fourth data packet on frequency f8, and so on. The advantage of interleaved retransmission with frequency hopping is better response time for all of the sensor nodes. For example, the receiving node 102 will now receive data from sensor nodes 120, 130 and 140 earlier as compared to the previous communication techniques. In the successive cycles or sub-cycles, the order of transmission from the sensor nodes can be changed to improve results.

Figures 5, 6:
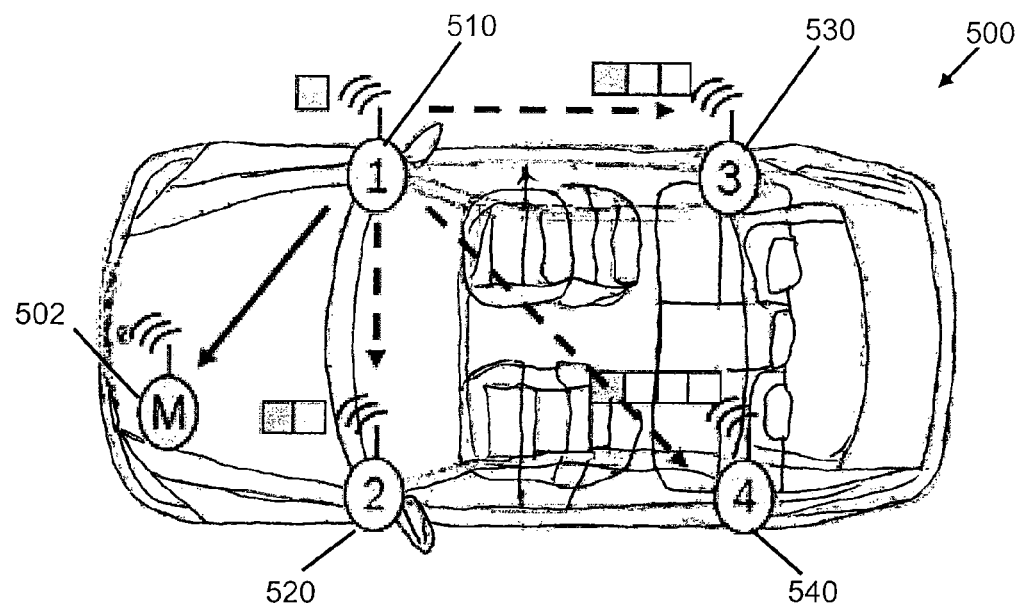
FIG. 5 illustrates an exemplary vehicle sensor network topology in which each of the sensor nodes includes a receiver and can retransmit the data of other sensor nodes.
FIG. 6 illustrates an aggregated data retransmission technique with interleaving and frequency hopping in which each sensor node not only transmits its own data but also transmits data received from other nodes.

FIG. 5 illustrates an exemplary physical topology for a wireless network 500 in a vehicle in which each of the sensor nodes includes a receiver. In the exemplary wireless network 500, there are four wheel sensors 510, 520, 530, 540 located at the wheels of the vehicle and a master device 502. FIG. 5 shows wheel sensor 110 transmitting data to the master unit 502 and to the other wheel sensors 520, 530, 540. Each of the wheel sensors 510, 520, 530, 540 transmits its own data to the master unit 502 and to the other wheel sensors. Each of the wheel sensors 510, 520, 530, 540 also receives and retransmits the data it receives from the other wheel sensors. Thus, the master device 502 can potentially receive sensor data for any of the sensors from any of the sensors. This embodiment will be utilized in some of the following communication techniques.

FIG. 6 illustrates the aggregated data retransmission technique with interleaving and frequency hopping. In this technique, each of the sensor nodes 510, 520, 530, 540 not only transmits its own data but also transmits data received from the other sensor nodes. FIG. 6 illustrates sensor node 510 initially sending sensor 510 data on frequency f1 to the receiving node 502 and to the other sensor nodes 520, 530 and 540; sensor node 520 then sends the received sensor 510 data and sensor 520 data on frequency f2 to the receiving node 502 and to the other sensor nodes 510, 530 and 540; sensor node 530 then sends the received sensor 510 and 520 data and sensor 530 data on frequency f3 to the receiving node 502 and to the other sensor nodes 510, 520 and 540, sensor node 540 then sends the received sensor 510, 520 and 530 data and sensor 540 data on frequency f4 to the receiving node 502 and to the other sensor nodes 510, 520 and 530. Now that each of the sensor nodes 510, 520, 530, 540 has received data for all of the other sensor nodes, each sensor node 510, 520, 530, 540 sends its current sensor data and the latest received sensor data from the other sensor nodes on the next frequency channel. The advantages of the aggregated data retransmission technique with interleaving and frequency hopping are greater redundancy, greater reliability and enabled communication even when there is no direct link between a given sensor node 510, 520, 530, 540 and the receiving node 502.

In certain cases the aggregated data retransmission technique with interleaving and frequency hopping can have performance bias because the last node to transmit will have the worst performance. To offset this imbalance, the order of node communications can be changed in subsequent cycles as illustrated in FIG. 7. FIG. 7 illustrates that in a first cycle and every fourth cycle thereafter, the sensor nodes transmit in the order 510, 520, 530, 540 as described in FIG. 6; in a second cycle and every fourth cycle thereafter, the sensor nodes transmit in the order 540, 530, 520, 510; in a third cycle and every fourth cycle thereafter, the sensor nodes transmit in the order 530, 540, 510, 520; and in a fourth cycle and every fourth cycle thereafter, the sensor nodes transmit in the order 520, 510, 540, 530. Of course the order of node transmission can have many other variations, and the number of cycles before repeating the order can be more or less than four.

To save time, a selected aggregated data retransmission technique with interleaving and frequency hopping can be used. This technique can be configured to only use the nodes with the best channel to the receiving node to aggregate data.

Figure 8:
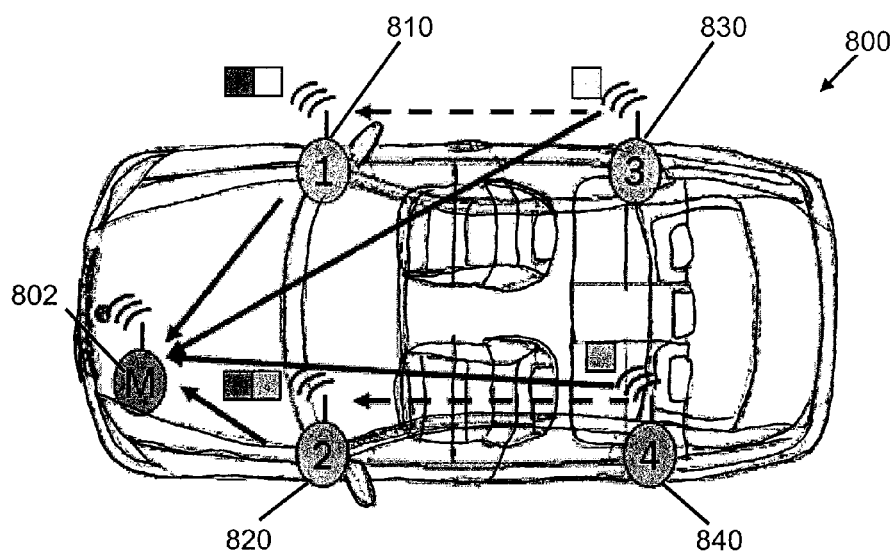
FIG. 8 illustrates an exemplary vehicle sensor network topology in which each of the sensor nodes includes a receiver and certain sensors are selected to aggregate and retransmit the data of other sensor nodes with its own data.

FIG. 8 illustrates an exemplary physical topology for a wireless network 800 in which selected sensor nodes aggregate and retransmit data received from other sensor nodes, and selected sensor nodes have more opportunity to transmit to the receiving node. In the exemplary embodiment of FIG. 8, there are four wheel sensors 810, 820, 830, 840 located at the wheels of the vehicle and a receiving node 802. As shown in FIG. 8, all of sensor nodes 810, 820, 830, 840 send sensor data to the receiving node 802. In addition, sensor node 810 receives the sensor data from sensor node 830 and sends the aggregated sensor data for nodes 810 and 830 to the receiving node 802; and sensor node 820 receives the sensor data from sensor node 840 and sends the aggregated sensor data for nodes 820 and 840 to the receiving node 802. This configuration can be used for many reasons, one example being if the direct communication links between sensor nodes 830 and/or 840 and the receiving node 802 are unreliable. In this case, the redundant indirect communication links through sensor nodes 810 and/or 820, respectively, help ensure that the receiving node 802 receives the signals from sensor nodes 830 and/or 840.

Figure 9:
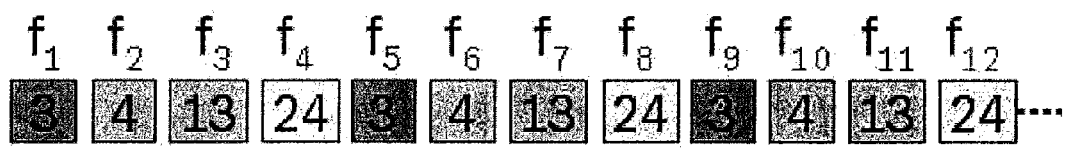
FIG. 9 illustrates a selected aggregated data retransmission technique with interleaving and frequency hopping in which selected sensor nodes periodically aggregate data from other nodes and send the aggregated data to the receiving node.

FIG. 9 illustrates a selected aggregated data retransmission technique with interleaving and frequency hopping using the embodiment of FIG. 8. In a first time slot, sensor node 830 sends sensor 830 data on frequency f1 to the receiving node 802; and this transmission is also received by sensor node 810. In a second slot, sensor node 840 sends sensor 840 data on frequency f2 to the receiving node 802; and this transmission is also received by sensor node 820. In a third slot, sensor node 810 sends sensor data received from sensor node 830 aggregated with current sensor 810 data on frequency f3 to the receiving node 802. In a fourth slot, sensor node 820 sends sensor data received from sensor node 840 aggregated with current sensor 820 data on frequency f4 to the receiving node 802. This four slot cycle of sending individual data for sensor nodes 830 and 840 followed by aggregated 810/830 and 820/

840 sensor data repeats on successive frequencies. The advantages of the selected aggregated data retransmission technique with interleaving and frequency hopping are that communication is possible between a given node and the receiving node even when the direct link between the nodes is bad and/or unreliable; and less slots are required than the aggregated data retransmissions technique with interleaving and frequency hopping.

In alternative implementations of selected aggregated data retransmission technique with interleaving and frequency hopping, the nodes can use different intermediate nodes for data aggregation and forwarding in different cycles. For example in a subsequent cycle, sensor node 810 could aggregate and send the sensor data from sensor node 840 and sensor node 820 could aggregate and send the sensor data from sensor node 830.

Figure 10:
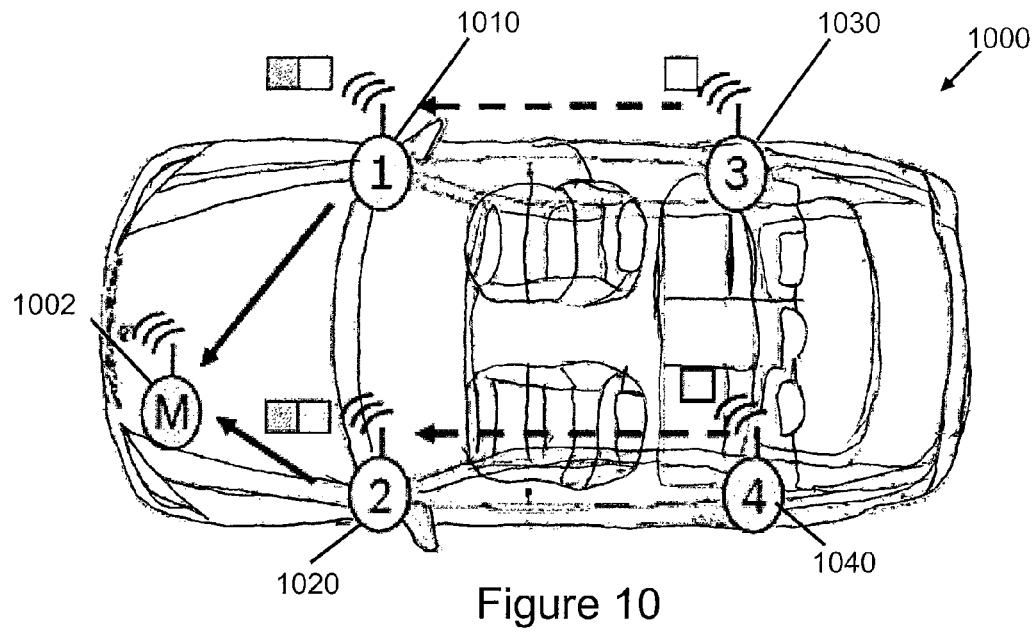
FIG. 10 illustrates an exemplary vehicle sensor network topology in which sensor nodes with less reliable communication links send data to sensor nodes with more reliable communication links for forwarding to the receiving node, and by using different frequency channels several communications can occur in parallel.
Figure 11:
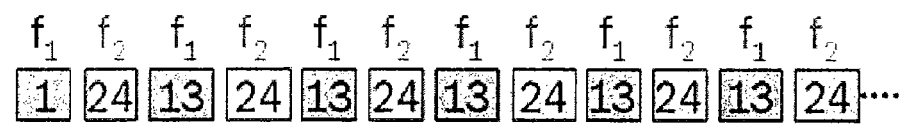
FIG. 11 illustrates a selected aggregated data forwarding technique with interleaving and frequency hopping in which the two nearest sensor nodes send sensor data to the receiving node while the rear sensor nodes transmit data to the front sensor nodes for aggregation and forwarding to the receiving node, and by using different frequency channels several communications can occur in parallel.
Figure 11:
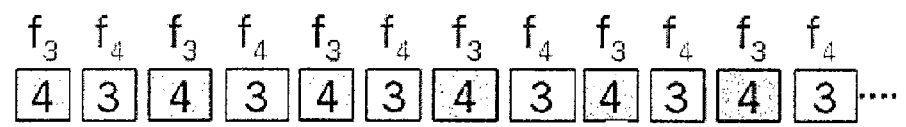

A selected aggregated data forwarding technique with interleaving and frequency hopping is illustrated in FIGS. 10 and 11. In this technique, the nodes with the best communication channel to the receiving node can act as intermediate hops for the rest of the nodes. FIG. 10 illustrates another exemplary physical wireless network topology 1000 that includes four wheel sensor nodes 1010, 1020, 1030, 1040 located at the wheels of the vehicle and a receiving node 1002. As shown in FIG. 10, only sensor nodes 1010 and 1020 send sensor data to the receiving node 1002. Sensor node 1010 receives the sensor data from sensor node 1030 and sends the aggregated data for nodes 1010 and 1030 to the receiving node 1002. Likewise, sensor node 1020 receives the sensor data from sensor node 1040 and sends the aggregated data for nodes 1020 and 1040 to the receiving node 1002.

FIG. 11 illustrates a selected aggregated data forwarding technique with interleaving and frequency hopping. In this technique, using the embodiment of FIG. 10, only the two nearest sensor nodes 1010 and 1020 send sensor data to the receiving node 1002, while the rear sensor nodes 1030 and 1040 transmit data to the front sensor nodes 1010 and 1020, respectively, for aggregation and forwarding to the receiving node 1002. In addition, by using different frequency channels several communications can occur in parallel, thereby reducing the number of time slots by a factor equivalent to the number of nodes acting as intermediate hops. FIG. 11 illustrates parallel communication with the upper row of data packets being communicated from the front sensor nodes 1010 and 1020 to the receiving node 1002, and the lower row of data packets being communicated from the rear sensor nodes 1030 and 1040 to the front sensor nodes 1010 and 1020. In the first time slot, sensor node 1010 sends sensor 1010 data on frequency f1 to the receiving node 1002, and in parallel sensor node 1040 sends sensor 1040 data on frequency f3 to sensor node 1020. In the second time slot, sensor node 1020 sends aggregated sensor 1020 and 1040 data on frequency f2 to the receiving node 1002, and in parallel sensor node 1030 sends sensor 1030 data on frequency f4 to sensor node 1010. In the third time slot, sensor node 1010 sends aggregated sensor 1010 and 1030 data on frequency f1 to the receiving node 1002, and in parallel sensor node 1040 sends sensor 1040 data on frequency f3 to sensor node 1020. The process of sending aggregated data from one of the front nodes 1010, 1020 to the receiving node 1002 while the other front node 1020, 1010 receives updated data from its associated rear node 1040, 1030 on a different frequency channel repeats.

Figures 12, 13:
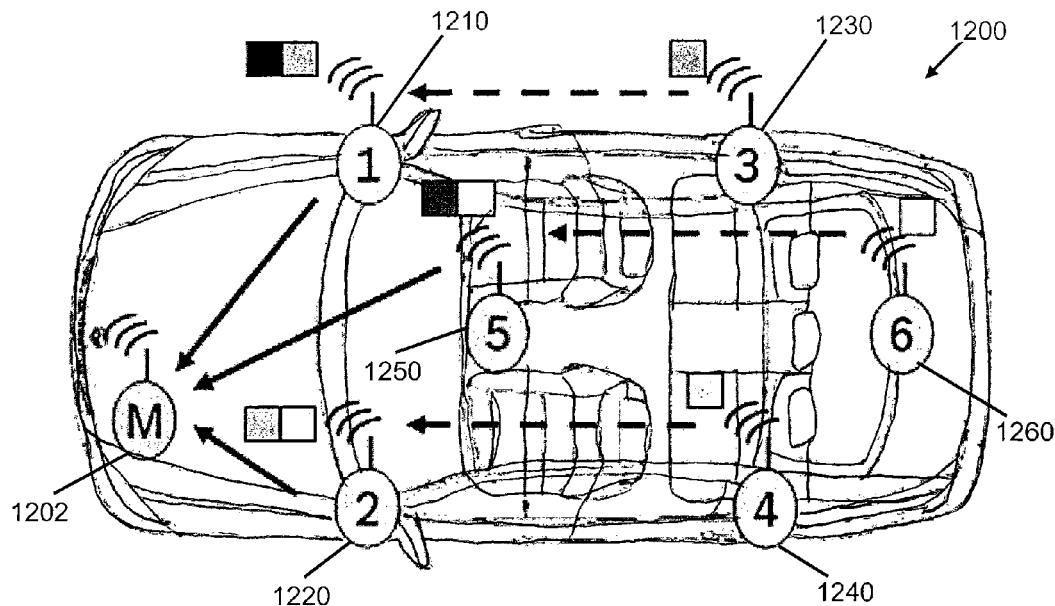
FIG. 12 illustrates an exemplary vehicle sensor network topology with six sensor nodes in which the sensor nodes with less reliable communication links send data to sensor nodes with more reliable communication links for forwarding to the receiving node, and by using different frequency channels several communications can occur in parallel.
FIG. 13 illustrates communications for a tree aggregation technique with frequency hopping in which the three nearest sensor nodes send sensor data to the root receiving node while the rear sensor nodes transmit data to the front sensor nodes for aggregation and forwarding to the root node, and by using different frequency channels several communications can occur in parallel.
Figures 14, 15:
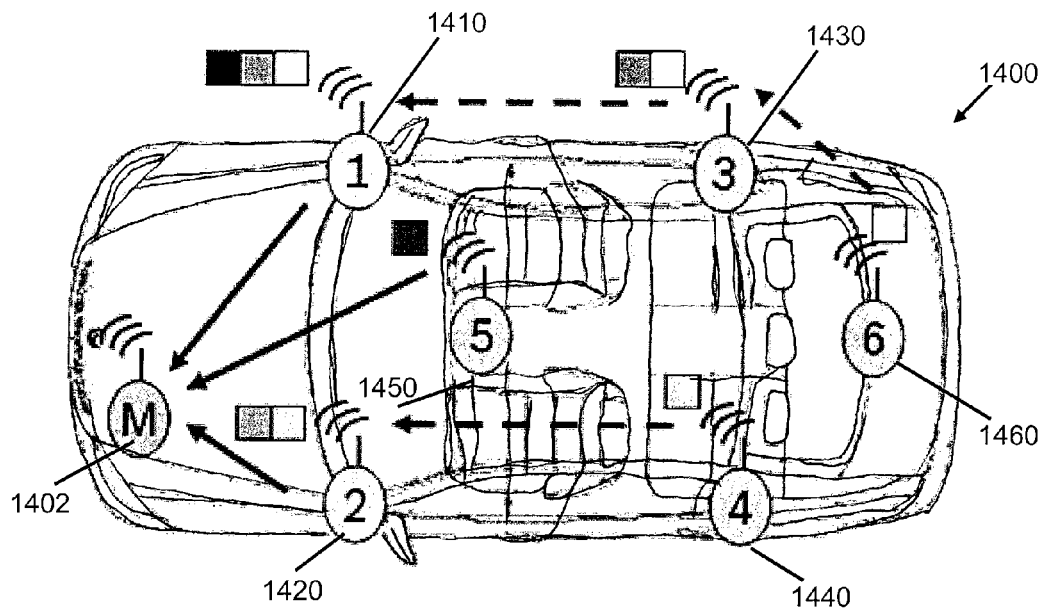
FIG. 14 illustrates the exemplary vehicle sensor network topology of FIG. 12 with different communication paths between the sensor nodes and root receiving node.
FIG. 15 illustrates communications for the tree aggregation technique with frequency hopping with an alternative tree structure in which the three nearest sensor nodes send sensor data to the root receiving node while the rear sensor nodes transmit data to the front and intermediate sensor nodes for aggregation and forwarding to the root node, and by using different frequency channels several communications can occur in parallel.

As the number of nodes in the network increases several other aggregation and forwarding techniques can be used. One such technique is tree based aggregation. Multiple trees can be formed in the wireless network with the receiving node as the root. The formation of the tree can be dependent on the communication link quality between node pairs and the overall network performance. FIGS. 12 and 13 show one tree and FIGS. 14 and 15 show an alternative tree for a six sensor node topology.

FIG. 12 illustrates an exemplary topology for a wireless network 1200 that includes six sensor nodes 1210, 1220, 1230, 1240, 1250 and 1260 located on different components of a vehicle and a receiving node 1202 which will act as the root node of the tree. FIG. 12 shows that only sensor nodes 1210, 1220 and 1250 send sensor data to the receiving node 1202. Sensor node 1210 receives sensor data from sensor node 1230 and sends the aggregated sensor data for nodes 1210 and 1230 to the receiving node 1202. Sensor node 1220 receives sensor data from sensor node 1240 and sends the aggregated sensor data for nodes 1220 and 1240 to the receiving node 1202. Sensor node 1250 receives sensor data from sensor node 1260 and sends the aggregated sensor data for nodes 1250 and 1260 to the receiving node 1202.

FIG. 13 illustrates communications for the tree aggregation technique with frequency hopping in the exemplary wireless network embodiment 1200. In this embodiment, the three nearest sensor nodes 1210, 1220, 1250 send sensor data to the root node 1202, while the rear sensor nodes 1230, 1240, 1260 transmit data to the front sensor nodes 1210, 1220, 1250, respectively, for aggregation and forwarding to the root node 1202. By using different frequency channels several communications can occur in parallel, thereby reducing the number of time slots by a factor equivalent to the number of nodes acting as intermediate hops.

FIG. 13 illustrates parallel communication with the upper row of data packets being communicated from the front sensor nodes 1210, 1220, 1250 to the receiving node 1202, and the three lower rows of data packets being communicated from the rear sensor nodes 1230, 1240, 1260 to the front sensor nodes 1210, 1220, 1250. In the first time slot, sensor node 1210 sends sensor 1210 data on frequency f1 to the receiving node 1202, and in parallel sensor node 1240 sends sensor 1240 data on frequency f4 to sensor node 1220 and sensor node 1260 sends sensor 1260 data on frequency f6 to sensor node 1250. In the second time slot, sensor node 1220 sends aggregated sensor 1220 and 1240 data on frequency f2 to the receiving node 1202, and in parallel sensor node 1230 sends sensor 1230 data on frequency f3 to sensor node 1210. In the third time slot, sensor node 1250 sends aggregated sensor 1250 and 1260 data on frequency f5 to the receiving node 1202. In the fourth time slot, sensor node 1210 sends aggregated sensor 1210 and 1230 data on frequency f1 to the receiving node 1202, and in parallel sensor node 1240 sends sensor 1240 data on frequency f4 to sensor node 1220 and sensor node 1260 sends sensor 1260 data on frequency f6 to sensor node 1250. The process of sending aggregated sensor data from one of the front nodes 1210, 1220, 1250 to the receiving node 1202 while the other front nodes 1210, 1220, 1250 receive updated sensor data from their associated rear nodes 1230, 1240, 1260 on a different frequency channel repeats.

FIG. 14 illustrates an alternative logical topology for a wireless network 1400 in a vehicle where the wireless network 1400 includes six sensor nodes 1410, 1420, 1430, 1440, 1450 and 1460 located on different components of the vehicle and a receiving node 1402 which will act as a root node for a tree. As shown in FIG. 14, only sensor nodes 1410, 1420 and 1450 send sensor data to the receiving node 1402. Sensor node 1430 receives sensor data from sensor node 1460, and sends the aggregated sensor data for nodes 1430 and 1460 to the sensor node 1410. Sensor node 1410 receives the aggregated sensor data from sensor node 1430 and sends the further aggregated sensor data for nodes 1410, 1430 and 1460 to the receiving node 1402. Sensor node 1420 receives sensor data from sensor node 1440 and sends the aggregated sensor data for nodes 1420 and 1440 to the receiving node 1402.

FIG. 15 illustrates communications for the tree aggregation technique with frequency hopping for the logical topology of the wireless network 1400. In this logical topology, the three nearest sensor nodes 1410, 1420, 1450 send sensor data to the root node 1402, while the rear sensor nodes 1430, 1440, 1460 transmit data to the front sensor nodes 1210, 1220. The rear node 1460 transmits sensor data to intermediate node 1430, and intermediate node 1430 aggregates the received sensor data from sensor node 1460 with its own data and sends the aggregated data to sensor node 1410. By using different frequency channels several communications can occur in parallel, thereby reducing the number of time slots by a factor equivalent to the number of nodes acting as intermediate hops.

FIG. 15 illustrates parallel communication with the upper row of data packets being communicated from the front sensor nodes 1410, 1420, 1450 to the receiving node 1402, and the three lower rows of data packets being communicated from the rear sensor nodes 1430, 1440, 1460 to the front and intermediate nodes. In the first time slot, sensor node 1410 sends sensor 1410 data on frequency f1 to the receiving node 1402, and in parallel sensor node 1440 sends sensor 1440 data on frequency f4 to sensor node 1420 and sensor node 1460 sends sensor 1460 data on frequency f6 to sensor node 1230. In the second time slot, sensor node 1420 sends aggregated sensor 1420 and 1440 data on frequency f2 to the receiving node 1402, and in parallel sensor node 1430 sends aggregated sensor 1430 and 1460 data on frequency f3 to sensor node 1410. In the third time slot, sensor node 1450 sends sensor 1450 data on frequency f5 to the receiving node 1402. In the fourth time slot, sensor node 1410 sends aggregated sensor 1410, 1430 and 1460 data on frequency f1 to the receiving node 1402, and in parallel sensor node 1440 sends sensor 1440 data on frequency f4 to sensor node 1420 and sensor node 1460 sends sensor 1460 data on frequency f6 to sensor node 1430. The process of sending aggregated sensor data from sensor nodes 1410 and 1420, and individual data from sensor node 1450, to the receiving node 1402 while the rear nodes 1430, 1440, 1460 send updated sensor data to their associated front or intermediate nodes 1410, 1420, 1430 on a different frequency channels repeats.

Some of the advantages of the tree aggregation technique with frequency hopping are improved scheduling for node communications, each node transmits to a selected node with good communication links, more reliable communication, communication between nodes with no direct communication link, and nodes can change their 'parent' or 'forwarding' nodes in subsequent cycles. For example, FIG. 12 shows node 1260 using node 1250 as its forwarding node and FIG. 14 shows node 1460 using node 1430 as its forwarding node. An alternative embodiment could switch back and forth between forwarding nodes periodically or based on certain conditions.

Several communication techniques can be combined together to improve the overall network performance. Different cycles can use different communication techniques. The communication techniques for different cycles can be predetermined or the system can use self-learning algorithms to select the optimal communication technique for a given cycle.

Figures 16, 17:
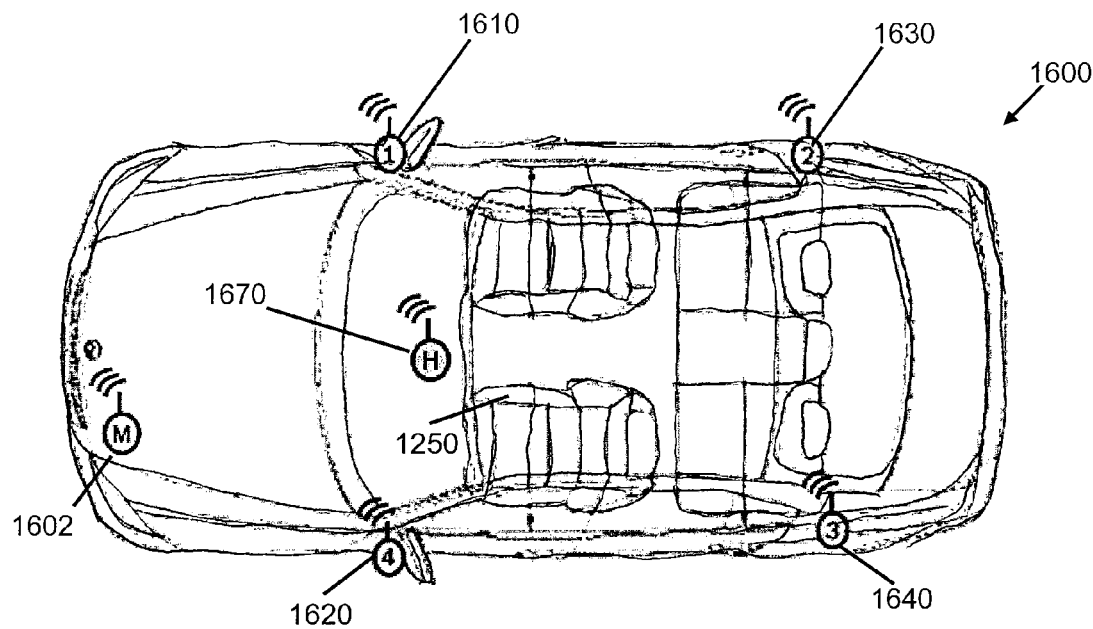
FIG. 16 illustrates an exemplary wireless vehicle sensor network topology with multiple sensor nodes, a receiving node, and a helper node positioned to create better communication links in the network.
FIG. 17 illustrates an exemplary communication technique where the receiving node includes two radios that enable it to receive transmissions simultaneously from multiple sensor nodes.

Additional nodes with good communication links to the receiving nodes, and also other intermediate nodes, can be added to assist communication between the receiving node and the other nodes of the network. FIG. 16 illustrates a physical topology of an exemplary wireless network 1600 which also includes a helper node. The exemplary wireless network 1600 includes front wheel sensor nodes 1610, 1620, rear wheel sensor nodes 1630, 1640, a receiving node 1602 and a helper node 1670. The helper node 1670 can be positioned to create better wireless communication links with the receiving node 1602 and/or with the rear wheel sensor nodes 1620 and 1630. The communication schedule can then have some time slots for the helper node 1670 to forward sensor data to the receiving node 1602. The helper node 1670 can transmit results of one or more nodes depending on the application requirements.

Receiving nodes, master nodes and other nodes of the network can include multiple radios for better performance. The use of multiple radios can reduce latency, and can enable a single node to communicate with multiple nodes simultaneously. FIG. 17 illustrates an exemplary communication scheme using the wireless network 1200 of FIG. 12 where the master node 1202 has two radios that enable it to receive transmissions simultaneously from nodes 1220 and 1250 on frequency channels $f_2$ and $f_5$, respectively. FIG. 17 illustrates parallel communication with the upper two rows of data packets being communicated between the front sensor nodes 1210, 1220, 1250 and the two radios of the receiving node 1202, and the three lower rows of data packets being communicated between the rear sensor nodes 1230, 1240, 1260 and the front sensor nodes 1210, 1220, 1250. In the first time slot, sensor node 1210 sends sensor 1210 data on frequency f1 to the receiving node 1202, and in parallel sensor node 1240 sends sensor 1240 data on frequency f4 to sensor node 1220 and sensor node 1260 sends sensor 1260 data on frequency f6 to sensor node 1250. In the second time slot, sensor node 1220 sends aggregated sensor 1220 and 1240 data on frequency f2 to the first radio of the receiving node 1202, and in parallel sensor node 1250 sends aggregated sensor 1250 and 1260 data on frequency f5 to the second radio of the receiving node 1202 and sensor node 1230 sends sensor 1230 data on frequency f3 to sensor node 1210. In the third time slot, sensor node 1210 sends aggregated sensor 1210 and 1230 data on frequency f1 to the receiving node 1202, and in parallel sensor node 1240 sends sensor 1240 data on frequency f4 to sensor node 1220 and sensor node 1260 sends sensor 1260 data on frequency f6 to sensor node 1250. The process of sending aggregated sensor data from sensor nodes 1220 and 1250 to the receiving node 1202 in one time slot, and sending aggregated sensor data from sensor node 1210 to the receiving node 1202 in the next time slot while sensor data from the rear nodes 1230, 1240, 1260 is updated on different frequency channels repeats. Note that this process only requires two time slots for updates of all six sensors, while the one radio embodiment illustrated in FIG. 13 requires three time slots.

Figure 18:
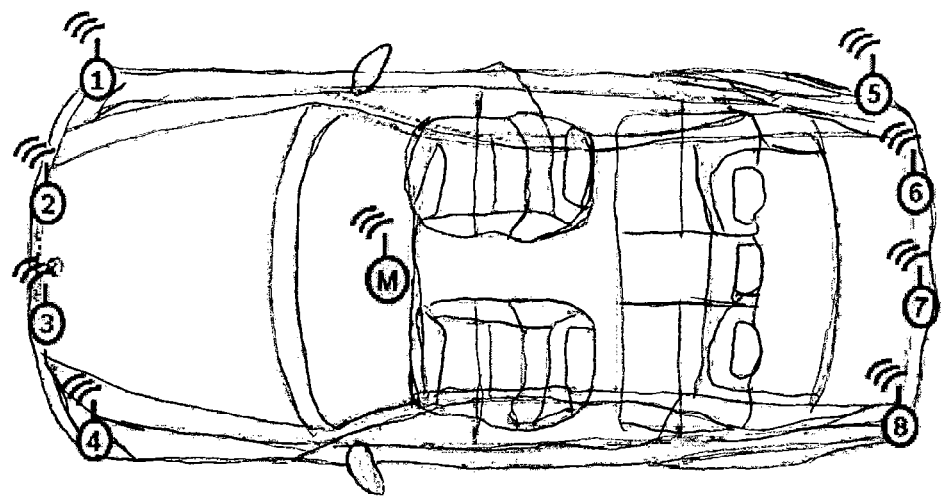
FIG. 18 illustrates a wireless parking assist system that includes eight bumper sensors and a master receiving node.
Figure 19:
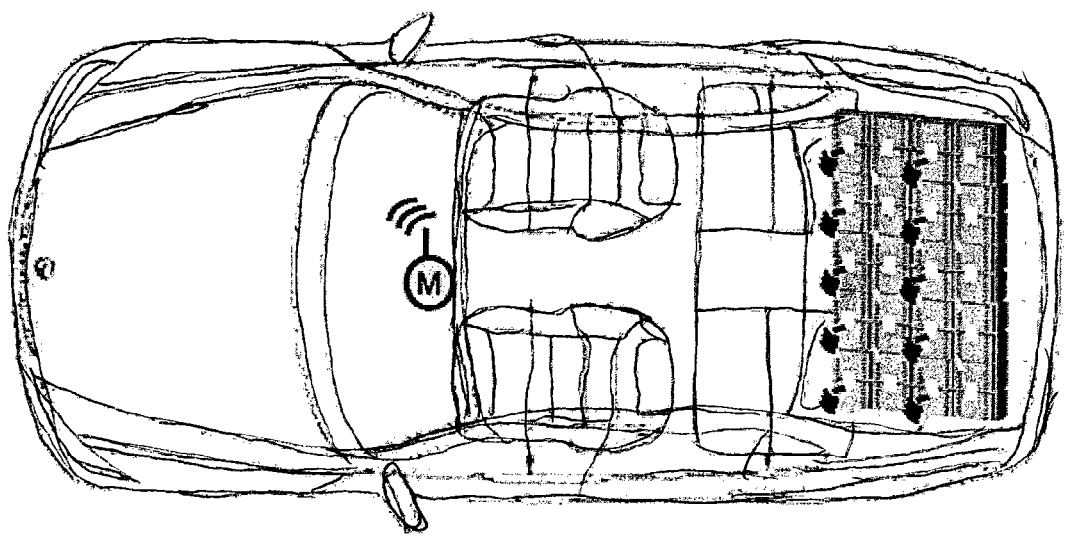
FIG. 19 illustrates a wireless battery management system that includes multiple battery sensors attached to each battery cell or group of battery cells to monitor the battery status and transmit the information to a master receiving node.

The exemplary embodiments shown above used wheel sensors. There are various sensors that can be used on wheels, for example wheel speed monitoring, tire pressure monitoring, load balancing monitoring, wheel position detection, and others. These communication techniques can also be used for various other vehicle sensor and monitoring systems. For example, FIG. 18 illustrates a wireless parking assist system that includes bumper sensors 1-8 and a master receiving node M. The bumper sensors 1-8 can communicate individually with the master node M, or they can aggregate their signals, or one or more helper nodes can be added as intermediate nodes between the bumper sensors 1-8 and the master receiving node M, or other techniques discussed herein can be used. As another example, FIG. 19 illustrates a wireless battery management system. A wireless node can be attached to each battery cell or group of battery cells to monitor the battery status and transmit the information to the master node M.

While this invention has been described as having an exemplary design, the present invention may be further modified within the spirit and scope of this disclosure. This application is therefore intended to cover any variations, uses, or adaptations of the invention using its general principles.

I claim:

1. A wireless communication system for a vehicle, the wireless communication system comprising:
a wireless receiving node;
a first wireless sensor node for wirelessly transmitting first sensor data on a set of frequency channels to the wireless receiving node, the first wireless sensor node periodically switching frequency channels of the set of frequency channels for wirelessly transmitting to the wireless receiving node;
a second wireless sensor node for wirelessly transmitting second sensor data on the set of frequency channels to the wireless receiving node, the second wireless sensor node periodically switching frequency channels of the set of frequency channels for wirelessly transmitting to the wireless receiving node; and
a third wireless sensor node for wirelessly transmitting third sensor data to the wireless receiving node,
wherein the wireless communication system evaluates transmission quality of wirelessly transmitting third sensor data directly from the third wireless sensor node to the wireless receiving node, evaluates transmission quality of wirelessly transmitting third sensor data from the third wireless sensor node to the wireless receiving node indirectly through the first wireless sensor node, and selects a selected transmission path for wirelessly transmitting third sensor data from the third wireless sensor node to the wireless receiving node; the selected transmission path having the highest transmission quality for wirelessly transmitting third sensor data to the wireless receiving node.

2. The wireless communication system of claim 1, wherein the first wireless sensor node receives the second sensor data wirelessly transmitted by the second wireless sensor node, aggregates the second sensor data with the first sensor data, and wirelessly transmits the second sensor data with the first sensor data to the wireless receiving node.

3. The wireless communication system of claim 1, wherein the set of frequency channels comprises a first frequency channel and a second frequency channel, the first frequency channel being different from the second frequency channel, the first wireless sensor node wirelessly transmitting on the first frequency channel and the second wireless sensor node wirelessly transmitting on the second frequency channel; and
wherein the wireless receiving node simultaneously receives the first sensor data wirelessly transmitted by the first wireless sensor node on the first frequency channel and the second sensor data wirelessly transmitted by the second wireless sensor node on the second frequency channel.

4. The wireless communication system of claim 1, wherein the set of frequency channels comprises a first set of frequency channels and a second set of frequency channels, the first set of frequency channels being different from the second set of frequency channels, the first wireless sensor node wirelessly transmitting on the first set of frequency channels and the second wireless sensor node wirelessly transmitting on the second set of frequency channels.

5. The wireless communication system of claim 4, wherein the first wireless sensor node periodically cycles through the first set of frequency channels, and the second wireless sensor node periodically cycles through the second set of frequency channels.

6. The wireless communication system of claim 4, wherein the wireless communication system evaluates transmission quality from the first wireless sensor node to the wireless receiving node on each of the frequency channels of the first set of frequency channels, selects a first frequency channel with the highest transmission quality from the first wireless sensor node to the wireless receiving node, and the first wireless sensor node uses the first frequency channel for transmitting to the wireless receiving node.

7. The wireless communication system of claim 6, wherein the wireless communication system periodically reevaluates transmission quality from the first wireless sensor node to the wireless receiving node on each of the frequency channels of the first set of frequency channels, updates the first frequency channel with the highest reevaluated transmission quality from the first wireless sensor node to the wireless receiving node, and the first wireless sensor node uses the updated first frequency channel for transmitting to the wireless receiving node.

8. The wireless communication system of claim 1,
wherein for each individual sensor node of the first, second and third wireless sensor nodes, the wireless communication system evaluates transmission quality of wirelessly transmitting sensor data directly from the individual sensor node to the wireless receiving node, evaluates transmission quality of wirelessly transmitting sensor data indirectly from the individual sensor node to the wireless receiving node through the other wireless sensor nodes, and selects a selected transmission path for wirelessly transmitting sensor data from the individual sensor node to the wireless receiving node; the selected transmission path having the highest transmission quality for wirelessly transmitting sensor data from the individual sensor node to the wireless receiving node.

9. The wireless communication system of claim 8, wherein for each individual sensor node of the first, second and third wireless sensor nodes, the wireless communication system periodically reevaluates transmission quality of wirelessly transmitting sensor data directly from the individual sensor node to the wireless receiving node, reevaluates transmission quality of wirelessly transmitting sensor data indirectly from the individual sensor node to the wireless receiving node through the other wireless sensor nodes, and updates the selected transmission path for wirelessly transmitting sensor data from the individual sensor node to the wireless receiving node; the updated selected transmission path having the highest reevaluated transmission quality for wirelessly transmitting sensor data from the individual sensor node to the wireless receiving node.

10. The wireless communication system of claim 1,
wherein the wireless communication system evaluates transmission quality of wirelessly transmitting third sensor data directly from the third wireless sensor node to the wireless receiving node, evaluates transmission quality of wirelessly transmitting third sensor data from the third wireless sensor node to the wireless receiving node indirectly through the first wireless sensor node using each of the frequency channels of the set of frequency channels, evaluates transmission quality of wirelessly transmitting third sensor data from the third wireless sensor node to the wireless receiving node indirectly through the second wireless sensor node using each of the frequency channels of the set of frequency channels, and selects a selected transmission path and frequency channel for wirelessly transmitting third sensor data from the third wireless sensor node to the wireless receiving node; the selected transmission path and frequency channel having the highest transmission quality for wirelessly transmitting third sensor data to the wireless receiving node.

11. A wireless communication system for a vehicle, the wireless communication system comprising:
a wireless receiving node;
a first wireless sensor node for wirelessly transmitting first sensor data to the wireless receiving node;
a second wireless sensor node for wirelessly transmitting second sensor data to the wireless receiving node, and
a wireless helper node for wirelessly transmitting sensor data from selected wireless sensors to the wireless receiving node; the helper node not sensing sensor data
wherein for each individual sensor node of the first and second wireless sensor nodes, the wireless communication system evaluates transmission quality of wirelessly transmitting sensor data directly from the individual sensor node to the wireless receiving node, evaluates transmission quality of wirelessly transmitting sensor data indirectly from the individual sensor node to the wireless receiving node through the wireless helper node, and selects a selected transmission path for wirelessly transmitting sensor data from the individual sensor node to the wireless receiving node; the selected transmission path having the highest transmission quality for wirelessly transmitting sensor data from the individual sensor node to the wireless receiving node.

12. The wireless communication system of claim 11, wherein the wireless helper node uses a set of frequency channels for wirelessly transmitting sensor data to the wireless receiving node; the wireless helper node periodically switching frequency channels of the set of frequency channels.

13. The wireless communication system of claim 12, wherein the wireless communication system evaluates the transmission quality from the wireless helper node to the wireless receiving node on each of the frequency channels of the set of frequency channels, selects a selected frequency channel with the highest transmission quality, and the wireless helper node uses the selected frequency channel for transmitting sensor data to the wireless receiving node.

14. The wireless communication system of claim 13, wherein for each individual sensor node of the first and second wireless sensor nodes, the wireless communication system evaluates transmission quality of wirelessly transmitting sensor data directly from the individual sensor node to the wireless receiving node, evaluates transmission quality of wirelessly transmitting sensor data indirectly from the individual sensor node to the wireless receiving node through the wireless helper node, and selects a selected transmission path for wirelessly transmitting sensor data from the individual sensor node to the wireless receiving node; the selected transmission path having the highest transmission quality for wirelessly transmitting sensor data from the individual sensor node to the wireless receiving node.

15. A wireless communication system for a vehicle, the wireless communication system comprising:
a wireless receiving node;
a plurality of wireless sensor nodes for wirelessly transmitting sensor data to the wireless receiving node, each wireless sensor node sensing local sensor data and transmitting the sensed local sensor data;
wherein for each individual sensor node of the plurality of wireless sensor nodes, the wireless communication system evaluates transmission quality of wirelessly transmitting sensor data directly from the individual sensor node to the wireless receiving node, evaluates transmission quality of wirelessly transmitting sensor data indirectly from the individual sensor node to the wireless receiving node through one or more of the other sensor nodes of the plurality of wireless sensor nodes, and selects a selected transmission path for wirelessly transmitting sensor data from the individual sensor node to the wireless receiving node; the selected transmission path having the highest transmission quality for wirelessly transmitting sensor data from the individual sensor node to the wireless receiving node.

16. The wireless communication system of claim 15, wherein the plurality of wireless sensor nodes use a set of frequency channels for wirelessly transmitting sensor data; and different wireless sensor nodes transmit sensor data simultaneously on different frequency channels of the set of frequency channels.

17. The wireless communication system of claim 16, wherein for each individual sensor node of the plurality of wireless sensor nodes, the wireless communication system evaluates the transmission quality along the selected transmission path on each of the frequency channels of the set of frequency channels, selects a selected frequency channel with the highest transmission quality, and the individual sensor node uses the selected frequency channel for transmitting sensor data to the wireless receiving node along the selected transmission path.

18. The wireless communication method of claim 15, further comprising a wireless helper node for wirelessly transmitting sensor data from selected wireless sensors of the plurality of wireless sensor nodes to the wireless receiving node; the helper node not sensing sensor data; and
wherein in determining the selected transmission path for each individual sensor node of the plurality of wireless sensor nodes, the wireless communication system evaluates transmission quality of wirelessly transmitting sensor data indirectly from the individual sensor node to the wireless receiving node through the wireless helper node, the wireless communication system evaluates transmission quality of wirelessly transmitting sensor data indirectly from the individual sensor node to the wireless receiving node through the wireless helper node and one or more of the other sensor nodes of the plurality of wireless sensor nodes.

* * * * *